(12) United States Patent
Won et al.

(10) Patent No.: US 12,346,223 B2
(45) Date of Patent: Jul. 1, 2025

(54) COMMIT BLOCK STRUCTURE AND DEVICE, FOR MULTIPLE FILE TRANSACTION

(71) Applicant: Korea Advanced Institute of Science and Technology, Daejeon (KR)

(72) Inventors: Youjip Won, Daejeon (KR); Joontaek Oh, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 220 days.

(21) Appl. No.: 18/255,563

(22) PCT Filed: Nov. 29, 2021

(86) PCT No.: PCT/KR2021/017784
§ 371 (c)(1),
(2) Date: Jan. 31, 2024

(87) PCT Pub. No.: WO2022/114899
PCT Pub. Date: Jun. 2, 2022

(65) Prior Publication Data
US 2024/0193052 A1    Jun. 13, 2024

(30) Foreign Application Priority Data
Nov. 27, 2020 (KR) .......... 10-2020-0163274

(51) Int. Cl.
*G06F 11/14* (2006.01)
*G06F 16/23* (2019.01)

(52) U.S. Cl.
CPC ...... *G06F 11/1469* (2013.01); *G06F 16/2365* (2019.01); *G06F 16/2386* (2019.01)

(58) Field of Classification Search
CPC .. G06F 11/14; G06F 11/1469; G06F 16/2386; G06F 16/2365
See application file for complete search history.

(56) References Cited

U.S. PATENT DOCUMENTS 7,072,912 B1 * 7/2006 Verma ............... G06F 16/1865
8,676,273 B1 * 3/2014 Fujisaki ............. H04M 1/724
455/418

(Continued)

FOREIGN PATENT DOCUMENTS

JP    2009-282752    12/2009
KR    10-2020-003758    4/2020

OTHER PUBLICATIONS

Yige Hu et al., 'TxFS: Leveraging File-system Crash Consistency to Provide ACID Transactions', ACM Transactions on Storage, May 2019, vol. 15, No. 2, Article 9, pp. 1-20, https://dl.acm.org/doi/abs/10.1145/3318159.

(Continued)

*Primary Examiner* — Kamini B Patel
(74) *Attorney, Agent, or Firm* — Christensen O'Connor Johnson Kindness PLLC

(57) ABSTRACT

Disclosed is a multiple file transaction method comprising: a first step in which, for each of a plurality of files, a file system of a host stores, in a master commit block, the location of an inode block in a storage, the inode block being a block in which an inode of the file is written; and a second step in which the file system stores the master commit block in the storage.

15 Claims, 5 Drawing Sheets

(56) References Cited

U.S. PATENT DOCUMENTS

| | | |
|---|---|---|
| 9,075,813 B2 | 7/2015 | Bacik |
| 11,734,000 B2 * | 8/2023 | Bryan .................... G06F 8/75 |
| | | 717/123 |
| 2002/0078244 A1 | 6/2002 | Howard |
| 2023/0161740 A1 * | 5/2023 | O'Doherty .......... G06F 16/1727 |
| | | 707/703 |
| 2024/0193052 A1 * | 6/2024 | Won ........................ G06F 9/46 |

OTHER PUBLICATIONS

International Search Report for International Application No. PCT/KR2021/017784, (International Filing Date: Nov. 29, 2021), mailed Mar. 24, 2022 (4 pages).

* cited by examiner

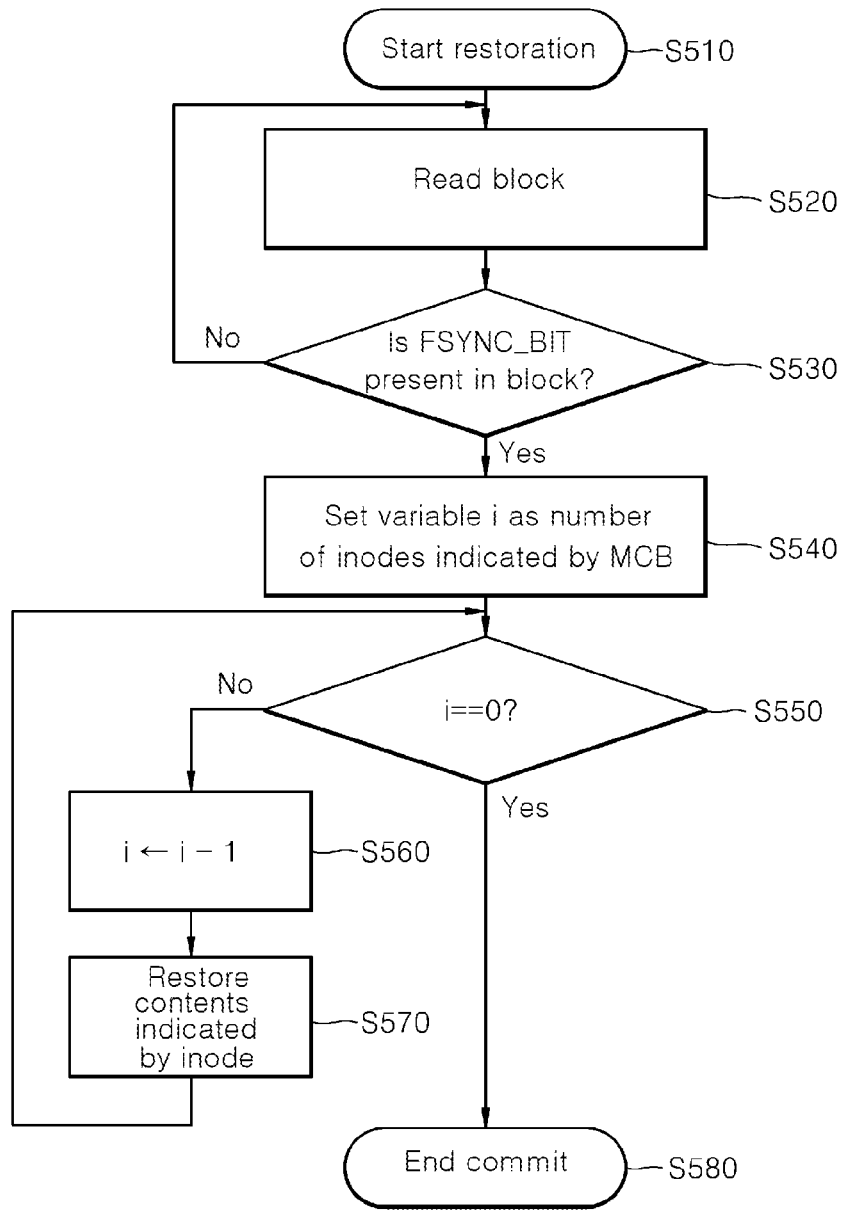

COMMIT BLOCK STRUCTURE AND DEVICE, FOR MULTIPLE FILE TRANSACTION

TECHNICAL FIELD

The present invention relates to computing technology, and more particularly, to a technique for managing a plurality of files modified by a transaction when a file system supports a transaction function.

RELATED ART

A set of multiple write operations executed atomically is defined as a transaction. Conventional log-based file systems include a file system that supports a transaction, such as, for example, F2FS and BTRFS. A transaction of the conventional log-based file system supports only a write operation on a single file.

When the log-based file system recodes modified file contents, the log-based file system is allocated with a new block, writes the modified contents, and updates reference information (file map) to indicate a new block at each block location of a file instead of overwriting the modified contents at an existing location. The updated reference information is written in a new block that is allocated.

A data structure that represents a series of information related to a file is called an inode. The inode contains a size of the file, information on an access right, and a location in a disk of each block that belongs to the file. The inode includes a bit to indicate that contents of the corresponding inode are up to date. This may be referred to as a restoration bit herein. In the case of an F2FS file system, the corresponding bit is called FSYNC_BIT. If a system crashes, a restoration module scans a disk. If an inode of which a restoration bit is set to '1' is discovered in the process of scanning, the restoration module regards information stored in a corresponding inode as latest information and restores a system by applying the corresponding contents.

The related art that supports a transaction function provides a transaction start system call and a transaction commit system call. Arguments of two system calls are files. To be accurate, when a user application (user) opens a file, a file descriptor assigned to each file is used as arguments. When the user calls the transaction start system call, modifications of a file transferred as arguments are added to a transaction. A unit that handles the modifications is a page that is a unit for caching contents of a storage device in a memory. That is, when the user calls the transaction start system call, modified pages of the file transferred as arguments are added to the transaction. When the user calls the transaction commit system call, all the pages included in the transaction are reflected to the storage device.

A single file transaction in the related art guarantees order between an inode write and a page write of a transaction to ensure atomicity of the transaction. Here, a target that guarantees write order with a page may be not an inode but another data structure that has reference information having a location on a storage device of pages. In the related art, the corresponding data structure and node are collectively referred to as a node. In the case of writing a plurality of nodes, write order is enforced such that a restoration bit is stored only in a last node to write and it is written after remaining pages and nodes. Once the write order is guaranteed, a restoration module may discover and restore the restoration bit only when all the transaction is written. Since contents of the transaction are reflected in a file system only when the contents of the transaction are completed written, atomicity is guaranteed.

In the related art, the atomicity is guaranteed by enforcing the write order between inode and transaction contents. A multi-file transaction needs to write a plurality of inodes. The multi-file transaction refers to a set of write requests for a plurality of files that are atomically performed. The multi-file transaction needs to guarantee atomicity of writing inodes as well as contents. Only when the inodes are completely written, transaction contents need to be restored.

In the log-based file system, atomicity of the multi-file transaction may not be guaranteed since the related art verifies a completion status of a transaction only with a single inode.

DETAILED DESCRIPTION

Technical Subject

The present invention provides a log-based file system that enables commit of a multi-file transaction.

Solution

According to an aspect of the present invention, there may be provided a method and apparatus that may commit a multi-file transaction in a log-based file system. In detail, the present invention defines a master commit block that is a new data structure for committing a multi-file transaction and proposes a method of committing a multi-transaction file group using the same.

The present invention defines a method and apparatus for committing a multi-file transaction of a log-based file system. The related art defines only a commit method of a single file transmission or a commit method of a journaling file system. The present invention defines a new data structure to solve limitations found in the related art and defines a method of committing a multi-file transaction through the corresponding data structure.

According to an aspect of the present invention, a data structure of a new master commit block may be provided. The master commit block refers to an on-disk data structure having block locations of inodes related to a transaction.

A master commit block provided according to an aspect of the present invention may include information on the number of files included in a multi-file transaction, information in which a value indicating a location of a block storing inodes of the files is written, and information representing an FSYNC_BIT flag.

In an implementation example, a total size of the master commit block includes 4,096 bytes. Here, the number of files belonging to the multi-file transaction are stored in uppermost 4 bytes. Addresses of blocks modified by the multi-file transaction may be stored in a remaining 4,092-byte space. Up to 1,023 may be stored.

In response to a user requesting a multi-file transaction commit, a file system generates a master commit block. Block locations (block numbers) of inodes written to files modified by the multi-file transaction may be stored in the master commit block. The multi-file transaction may allocate FSYNC_BIT to the master commit block, may set this value to 1, and may use the same to restore a transaction, instead of setting FSYNC_BIT present in an inode block. Order between inode and transaction contents may not be guaranteed. Instead, order between the entire transaction contents including the inode and the master commit block may be guaranteed.

When a crash occurs in the log-based file system, the master commit block with the FSYNC_BIT flag may be found from a storage device. The master commit block is written (written) in a state in which write order with remaining transaction contents is guaranteed. Therefore, that the master commit block is found indicates that all other transaction contents are written (written). Contents of the multi-file transaction may be restored by referring to inode blocks indicated by the master commit block.

A method of committing a multi-file transaction provided according to an aspect of the present invention may use a process of generating a master commit block and storing the same in a storage. In response to a user requesting for a multi-file transaction commit, a file system may generate a master commit block. Then, the file system may sequentially reflect files belonging to the multi-file transaction to a storage device. An inode block location of each of the files may be stored in the master commit block. When the files are all reflected to the storage, the FSYNC_BIT flag may be attached to the master commit block. Then, flush may be called to the storage device to guarantee write order between transaction contents and the master commit block. Then, the master commit block may be reflected to the storage device.

A multi-file transaction method provided according to an aspect of the present invention includes a first operation in which, for each of a plurality of files, a file system of a host stores a location of an Mode block that is a block in which an inode of the file is written within a storage in a master commit block; and a second operation in which the file system stores the master commit block in the storage.

Here, in response to the storage discovering the master commit block while performing a process of restoring blocks of the storage, the storage may be configured to restore contents indicated by inodes written in a plurality of inode blocks stored in the master commit block.

Here, in the first operation, the file system may be configured to provide contents of a transaction related to the file to the storage before storing the location of the inode block of the file in the master commit block. Between the first operation and the second operation, the storage may be configured to write contents of a transaction related to the plurality of files in a non-transitory memory of the storage. In response to the storage discovering the master commit block while performing a process of restoring blocks of the storage, the storage may be configured to restore contents indicated by inodes written in the plurality of inode blocks stored in the master commit block.

Here, the multi-file transaction method may further include an operation in which the file system generating the master commit block when a commit call is received from an application of the host before the first operation. In the first operation, the file system may be configured to provide contents of a transaction related to the file to the storage before storing the location of the inode block in the master commit block.

Here, when the file system provides the contents of the transaction related to the file to the storage, the storage may be configured to store the contents of the transaction in a non-transitory memory of the storage.

Here, the multi-file transaction method may further include an operation in which the file system stores a first flag in the master commit block between the first operation and the second operation. In response to the first flag being verified to be present in a first block read by the storage while the storage is performing a process of storing blocks of the storage, the storage may be configured to determine that the first block is the master commit block.

Here, when the file system stores the first flag in the master commit block, a predetermined value may be stored in a predesignated part of the master commit block. When the file system does not store the first flag in the master commit block, a value different from the predetermined value may be stored in the predesignated part of the master commit block.

Here, the storage may be configured to restore contents indicated by inodes stored in the plurality of inode blocks stored in the first block.

Here, the multi-file transaction method may further include an operation in which the file system flushes the storage between the first operation and the second operation.

Here, when the file system flushes the storage, the storage may be configured to store contents of a transaction related to the plurality of files in information written in a transitory memory of the storage in a non-transitory memory of the storage.

According to another aspect of the present invention, a host (=host computing device) including a processing unit; and a communication unit may be provided. Here, the processing unit is configured to execute a file system of the host. The file system is configured to execute a first operation of, for each of a plurality of files, storing a location of an inode block that is a block in which an inode of the file is written within a storage in a master commit block; and a second operation of storing the master commit block in the storage using the communication unit.

Here, in the first operation, the file system may be configured to provide contents of a transaction related to the file to the storage before storing the location of the inode block of the file in the master commit block. Between the first operation and the second operation, the storage may be configured to write contents of a transaction related to the plurality of files in a non-transitory memory of the storage. In response to the storage discovering the master commit block while performing a process of restoring blocks of the storage, the storage may be configured to restore contents indicated by inodes written in the plurality of mode blocks stored in the master commit block.

According to another aspect of the present invention, a computing device including a host and a storage may be provided. Here, the host is configured to execute a file system. The file system is configured to execute a first operation of, for each of a plurality of files, storing a location of an inode block that is a block in which an inode of the file is written within a storage in a master commit block; and a second operation of storing the master commit block in the storage. In response to the storage discovering the master commit block stored in the storage while performing a process of restoring blocks of the storage, the storage is configured to restore contents indicated by modes written in the plurality of inode blocks stored in the master commit block.

Here, in the first operation, the file system may be configured to provide contents of a transaction related to the file to the storage before storing the location of the inode block of the file in the master commit block. Between the first operation and the second operation, the storage may be configured to write contents of a transaction related to the plurality of files in a non-transitory memory of the storage.

Here, the processing unit may be a central processing unit (CPU) of the host and the communication unit may include a driving unit of a physical layer signal exchanged through a wired or wireless transmission channel that connects the host and the storage.

A method of restoring a multi-file transaction provided according to an aspect of the present invention may use the aforementioned master commit block. When a crash occurs in a log-based file system, a restoration process may be performed. Herein, a storage may sequentially read blocks during the restoration process. Then, the storage may verify whether an FSYNC_BIT flag is attached to each block. If the FSYNC_BIT flag is attached, the storage may determine that a corresponding file is a file to be restored. If a block to which the FSYNC_BIT flag is attached is a master commit block, all inodes indicated by the master commit block may be restored.

The present invention may be applied to all the fields that use a log-based structure, for example, a log-based file system such as F2FS, BtrFS, Stripe LFS, and BSD-LFS, and a database system using a log-based data structure such as RocksDB, MongoDB, and LevelDB. That is, the present invention may be applied to all servers and embedded devices using a log-based structure or all services using the same.

The present invention may be applied to any software that uses a log-based structure. The present invention allows corresponding software to more efficiently support a multi-file transaction. For example, the present invention expands a single file transaction of F2FS to the multi-file transaction and allows a compaction operation of RocksDB to remove a MANIFEST file that writes a multi-file transaction process and to guarantee atomicity through a multi-file transaction of an operating system (OS).

Effect

According to the present invention, it is possible to provide a log-based file system that enables commit of a multi-file transaction.

BRIEF DESCRIPTION OF DRAWINGS

FIG. 7 is a flowchart illustrating a method of restoring, by a storage, data according to an example embodiment of the present invention.

MODE

Hereinafter, example embodiments of the present invention will be described with reference to the accompanying drawings. However, the present invention is not limited to the example embodiments set forth herein and may be implemented in various forms. Terms used herein are provided to help understanding of the example embodiments and are not intended to limit the scope of the present invention. Also, singular forms used in the following include plural forms, unless the context clearly indicates otherwise.

Figure 1:
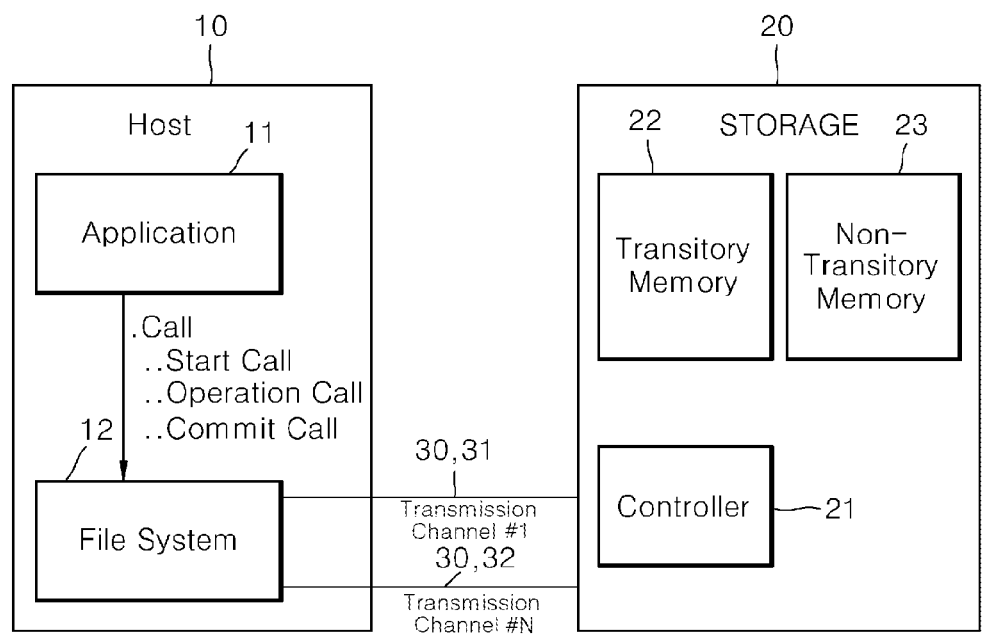
FIG. 1 illustrates a concept of writing, by a host, information in a storage according to an example embodiment.

FIG. 1 illustrates a concept of writing, by a host, information in a storage according to an example embodiment.

Each of a host 10 and a storage 20 may be a computing device that operates with power supplied from a power supply. The host 10 and the storage 20 may exchange data and a command through one or more transmission channels 30. The transmission channels may be wireless channels or wired channels. The host 10 and the storage 20 may share power supplied from one power supply, or may be supplied with power from two different power supplies, respectively.

The host 10 may include a central processing unit (CPU), a memory, a power supply, and a communication device.

The storage 20 may include a controller 21, a transitory memory 22, and a non-transitory memory 23.

The host 10 may transmit various commands and data to the storage 20 through the transmission channels 30. The command may include a write command.

The controller 21 of the storage 20 may store data received from the transmission channels 30 in the transitory memory 22 in response to a command received from the transmission channels 30. The data stored in the transitory memory 22 may be stored in the non-transitory memory 23 according to a rule followed by the controller 21. The data stored in the transitory memory 22 may be deleted when power supplied to the storage 20 is cut off. However, data stored in the non-transitory memory 23 is not deleted although power supplied to the storage 20 is cut off.

The host 10 may execute an application 11 and a file system 12. The application 11 and the file system 12 may run in such a manner that predetermined command codes stored in a memory accessed by the host 10 are executed by the CPU included in the host 10.

In an example embodiment, the application 11 may be a program that is executed or terminated when a user using the host 10 provides a user input through a user interface provided from the host 10.

In an example embodiment, the file system 12 may be a program that is automatically executed by the host 10 when power is applied to the host 10 or a reset is performed.

The application 11 may transmit various system calls to the file system 12. The file system 12 may execute a task corresponding to the system call.

The host 10 may execute a transaction. A predetermined amount of time may be used until a specific transaction starts and ends.

The application 11 may control start and commit of the transaction. The application 11 may also control one or more operations to be executed during the transaction. As illustrated in FIG. 1, the application 11 may transmit, to the file system 12, system calls that include a start call, a set of operation calls, and a commit call.

The specific transaction may start in response to the start call, commands to be delivered from the host 10 to the storage 20 may be prepared in response to the set of operation calls, and the prepared commands may be delivered to the storage 20 through the transmission channels 30 in response to the commit call.

Figure 2:
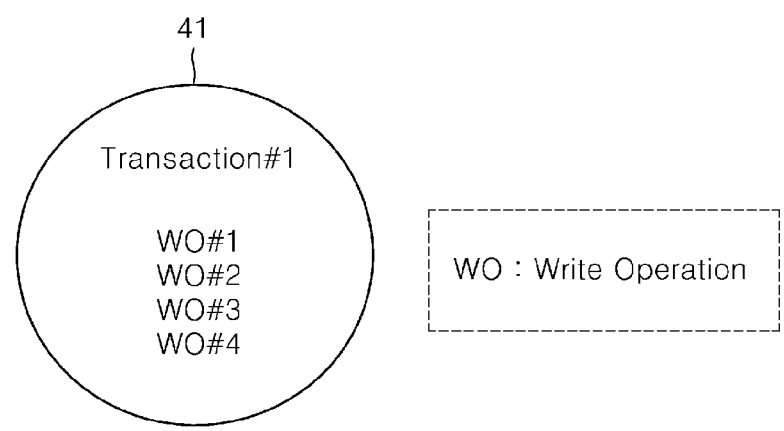
FIG. 2 illustrates a transaction executed by a host.

FIG. 2 illustrates a transaction executed by a host.

A set of multiple operations may constitute one transaction.

A first transaction 41 may include four write operations WO #1, WO #2, WO #3, and WO #4. Although FIG. 2 shows an example in which only write operations are included in each transaction, other types of operations may be included.

Figure 3:
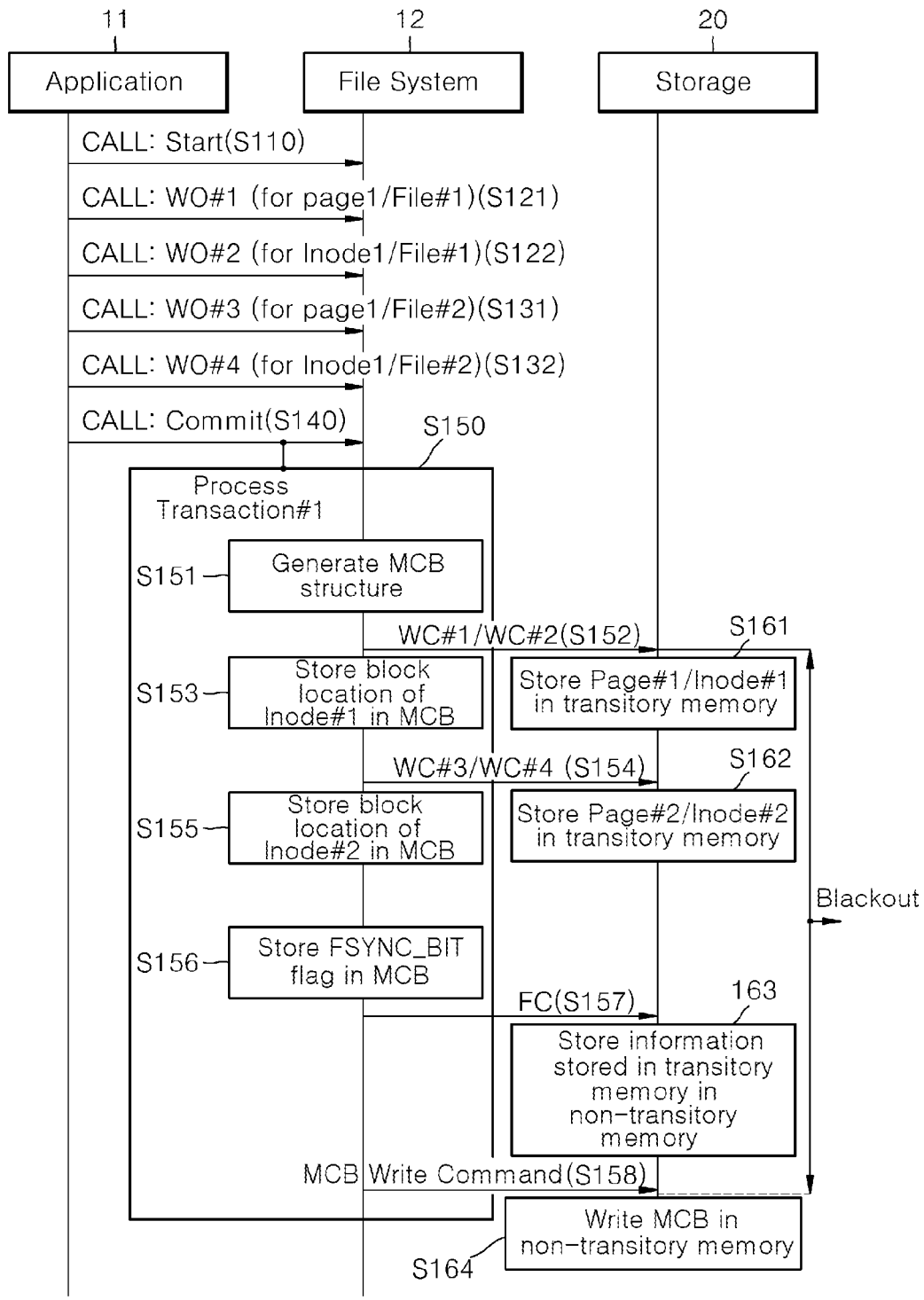
FIG. 3 is a flowchart illustrating a method of committing a multi-file transaction in a log-based file system provided according to an example embodiment of the present invention.

FIG. 3 is a flowchart illustrating a method of committing a multi-file transaction in a log-based file system provided according to an example embodiment of the present invention.

In operation S110, the application 11 may transmit a start call to the file system 12. Through this, a first transaction may start. In response to receiving the start call, the file system 12 may start a process for the first transaction.

In operation S121, the application 11 may call a write operation call WO #1 for a first page of a first file to the file system 12.

In operation S122, the application 11 may call a write operation call WO #2 for a first inode of the first file to the file system 12.

In operation S131, the application 11 may call a write operation call WO #3 for a second page of a second file to the file system 12.

In operation S132, the application 11 may call a write operation call WO #4 for a second inode of the second file to the file system 12.

In operation S140, the application 11 may call a commit call to the file system 12.

In operation S150, the file system 12 may process the first transaction in response to the commit call. That is, the file system 12 may reflect pages of all the files included in the first transaction to the storage 20.

Operation S150 may include operation S151 to operation S158.

In operation S151, the file system 12 may generate one master commit block (MBC) having a structure according to an example embodiment of the present invention.

Figure 4:
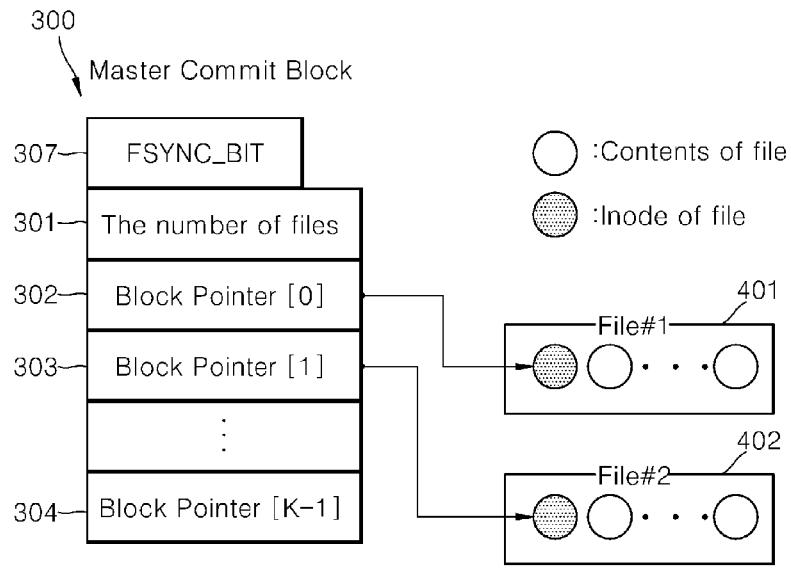
FIG. 4 illustrates a structure of a master commit block provided according to an aspect of the present invention.

FIG. 4 illustrates a structure of a master commit block provided according to an aspect of the present invention.

In an implementation example, a total size of a master commit block 300 includes N bytes (e.g., N=4,096).

Here, the number of inode block locations in the master commit block 300 is stored in uppermost N1 bytes 301 (e.g., N1=4). Block addresses with an N1-byte size may be stored in a remaining {N-N1}-byte space in the master commit block 300 by N/N1??1.

Block locations (block numbers) of modes written by a multi-file transaction through the first transaction may be stored in parts (302, 303, 304) of the master commit block 300, respectively.

Here, a block location of each of the modes may be an address that represents a location of a block in which a corresponding inode is stored within the storage 20.

For example, a block location of a first mode of a first file (File #1) 401 may be stored in a first part 302, and a block location of a second inode of a second file (File #2) 402 may be stored in a second part 303. Here, the first file (File #1) 401 and the second file (File #2) 402 are files included in the first transaction.

Instead of attaching an FSYNC_BIT flag to an inode block, an FSYNC_BIT flag 307 may be attached to the master commit block.

Order between an mode and transaction contents may not be guaranteed.

Instead, order between the entire contents of the transaction including the inode and the master commit block 300 may be guaranteed.

When a crash occurs in a log-based file system, the master commit block 300 attached with the FSYNC_BIT flag 307 may be found from a storage device.

The master commit block 300 is written in a state in which write order with remaining transaction contents is guaranteed. Therefore, that the master commit block 300 is found represents that other transaction contents are completely written.

Referring again to FIG. 3, in operation S152, the file system 12 may transmit a write command (WC #1, WC #2) corresponding to the write operation call (WO #1, WO #2) to the storage 20. Information on the first inode (Inode #1) of the first file (File #1) may be included in the write command (WC #1, WC #2).

In operation S153, the file system 12 may store a block location (block number) of the first inode (Inode #1) in a part of the master commit block 300.

Figure 6:
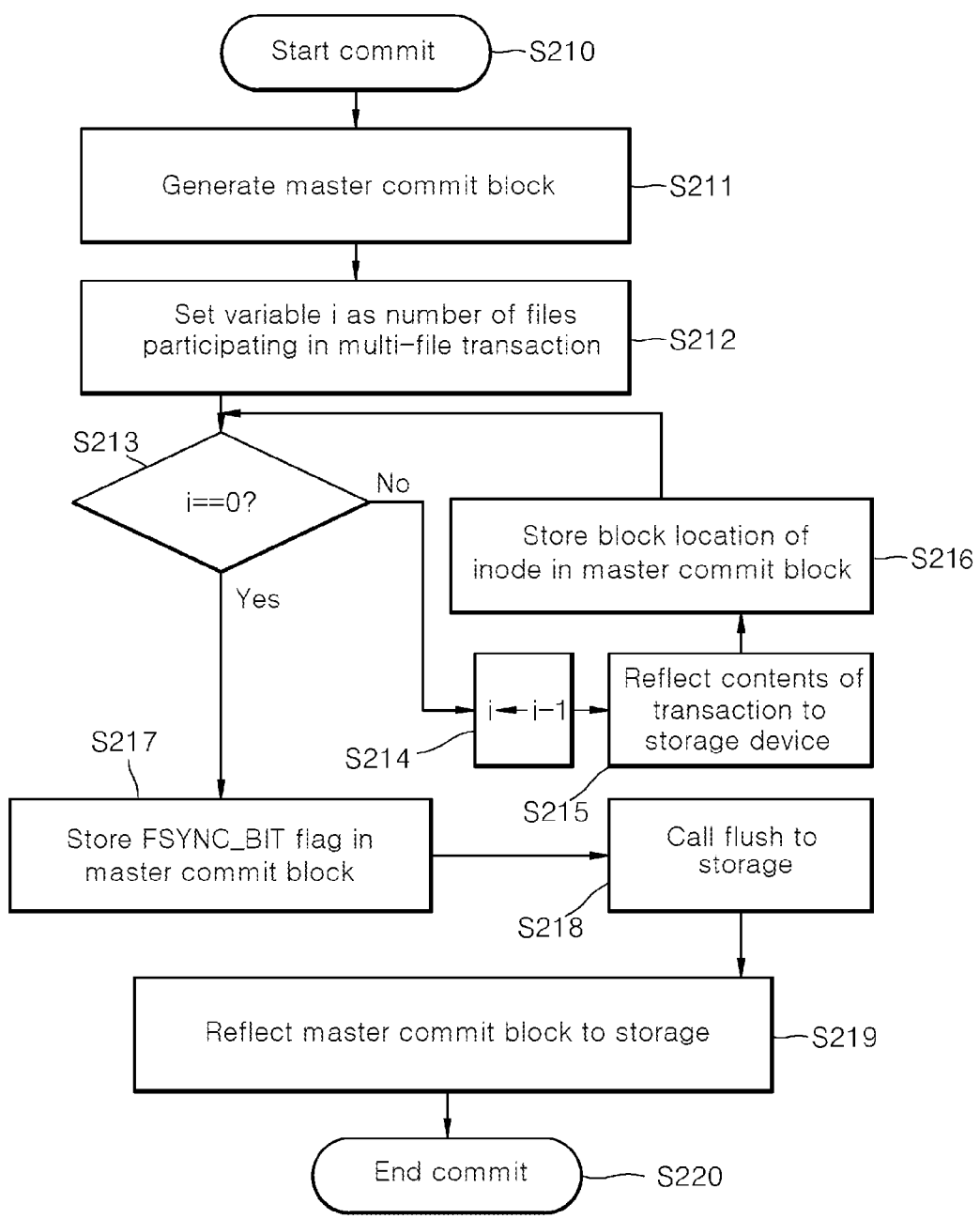
FIG. 6 is a flowchart illustrating the method of committing the multi-file transaction of FIG. 3 according to another aspect.

Operation S153 of FIG. 3 corresponds to the following operation S216 of FIG. 6. Operation S215 of FIG. 6 is an operation of reflecting contents of an i-th file among files included in the transaction to the storage device. Here, an mode of the i-th file is included in file contents. That is, since operation S153 of FIG. 3 is performed immediately after the inode is stored in the non-transitory memory, the file system 12 may be aware of a block location of the inode.

Operation S152 and operation S153 may be iteratively executed for all other files included in the first transaction.

For example, in operation S154, the file system 12 may transmit a write command (WC #3, WC #4) corresponding to the write operation call (WO #3, WO #4) to the storage 20. Information on a third inode (Inode #3) of a third file (File #1) may be included in the write command (WC #3, WC #4).

In operation S155, the file system 12 may store a block location (block number) of the second inode (Inode #2) in a part of the master commit block 300.

If all files included in the first transaction are written in the transitory memory 22 of the storage 20, the file system 12 may transmit a flush command (FC) to the storage 20 in operation S157.

In operation S158, the file system 12 may transmit, to the storage 20, an MCB write command to write the master commit block 300 in the storage 20. The MCB write command may include contents of the master commit block 300.

The storage 20 may perform the following operations in response to the commands received from the file system 12.

In operation S161, when the storage 20 receives the write command (WC #1, WC #2), the storage 20 stores the first page (Page #1) and the first inode (Inode #1) in the transitory memory 22.

In operation S162, when the storage 20 receives the write command (WC #3, WC #4), the storage 20 stores the second page (Page #2) and the second inode (Inode #2) in the transitory memory 22.

In operation S163, when the storage 20 receives the flush command (FC), the storage stores, in the non-transitory memory 23, information on the first transaction that is stored in the transitory memory 22.

In operation S164, the storage 20 may store the master commit block 300 in the non-transitory memory 23.

When a problem, such as blackout, occurs in the storage 20 after operation S152 starts and before operation S164 ends, the contents of files related to the first transaction written in the non-transitory memory 23 are invalidated.

Figure 5:
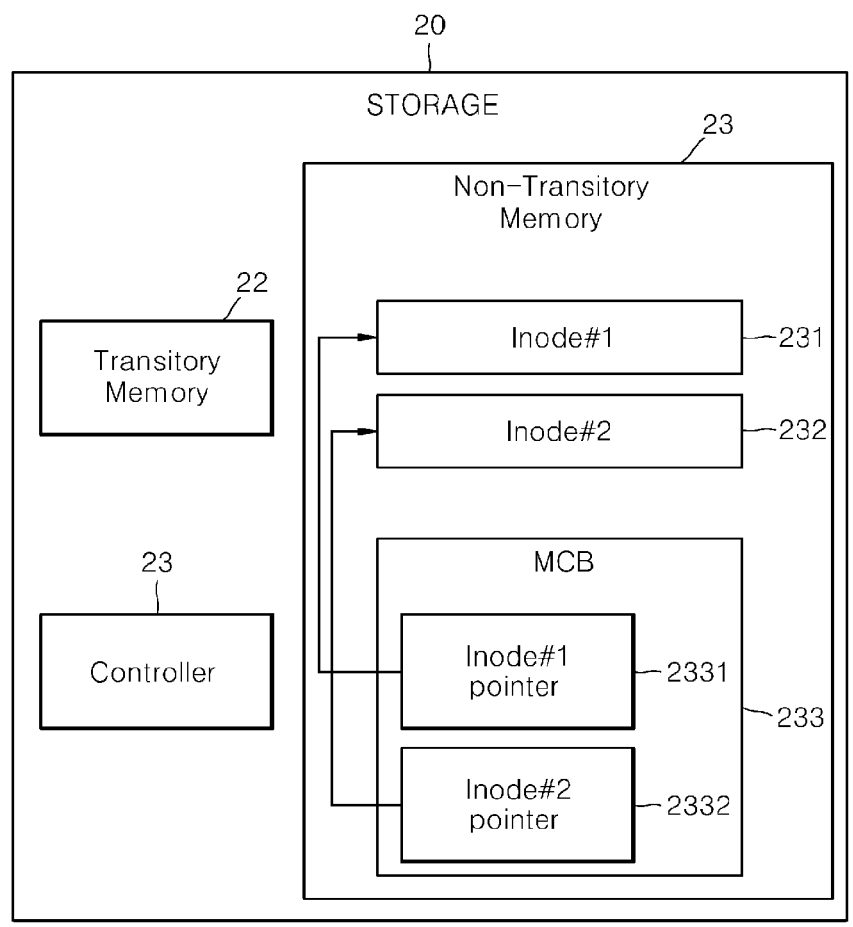
FIG. 5 illustrates a relationship between a master commit block (MCB) and inode information stored in a storage by the method of committing the multi-file transaction of FIG. 3.

FIG. 5 illustrates a relationship between MCB and inode information stored in a storage by the method of committing the multi-file transaction of FIG. 3.

In FIG. 5, reference numeral 231 denotes a first block 231 in which a first inode (Inode #1) is stored, reference numeral 232 denotes a second block 232 in which a second inode (Inode #2) is stored, and reference numeral 233 denotes a third block 233 in which the master commit block 300 is stored.

The first inode pointer 2331 included in the third block 233 has a value for an address of the first block 231 and the second inode pointer 2332 has a value for an address of the second block 232.

FIG. 6 is a flowchart illustrating the method of committing the multi-file transaction of FIG. 3 according to another aspect.

In operation S210, in response to receiving a commit call from the application 11, the file system 12 may start to commit the first transaction.

In operation S211, the file system 12 may generate the master commit block 300 for the first transaction.

In operation S212, the file system 12 may set a variable i as the number of files participating in the first transaction that is a multi-file transaction.

In operation S213, the file system 12 may verify whether a value of the variable i is 0. If the value of the variable i is 0, operation S217 may be performed. Unless the value of the variable i is 0, operation S214 may be performed.

In operation S214, the value of the variable i may be reduced by '1.' In operation S215, the file system 12 may reflect contents of an i-th file among files participating in the first transaction to the storage 20. Here, a modified page in the i-th file and an Mode of the i-th file may be reflected to the storage 20.

In operation S216, the file system 12 may store a block location of the inode of the i-th file in the master commit block 300.

In operation S217, the file system 12 may store an FSYNC_BIT flag in the master commit block 300.

In operation S218, the file system 12 may call a flush to the storage 20.

In operation S219, the storage 20 may store the master commit block 300 in the storage 20.

In operation S220, the file system 12 may terminate the commit.

FIG. 7 is a flowchart illustrating a method of restoring, by a storage, data according to an example embodiment of the present invention.

The method of FIG. 7 may be validly used when the storage 20 stores data based on the method of committing the multi-file transaction presented in FIG. 3 or FIG. 6.

In operation S510, the storage 20 may start to restore the storage 20.

Start of restoration may be triggered under various conditions.

In operation S520, the storage 20 may read blocks present in the non-transitory memory 23.

In operation S530, the storage 20 may determine whether FSYNC_BIT is present in a read block. If FSYNC_BIT is present, operation S540 may be performed. If FSYNC_BIT is absent, another block may be read by returning to operation S520.

That FSYNC_BIT is present in the read block may indicate that a bit of a predesignated location in the read block has a predetermined value. On the contrary, that FSYNC_BIT is absent in the read block may indicate that the bit of the predesignated location in the read block has a value different from the predetermined value.

In operation S540, the storage 20 may set the variable i as the number of inodes indicated by the master commit block 300 included in a block in which the FSYNC_BIT is present.

In operation S550, the storage 20 may verify whether the value of the variable i is 0. If the value of the variable i is 0, operation S580 may be performed. Unless the value of the variable i is 0, operation S560 may be performed.

In operation S560, the storage 20 may reduce the value of the variable i by '1.' In operation S570, the storage 20 may restore contents indicated by an inode corresponding to the variable i.

In operation S580, the storage 20 may terminate the restoration.

Each of operations of FIG. 7 may be executed by the controller 21 of the storage 20.

It will be apparent to those skilled in the art to which the present invention pertains that various alternations and modifications may be easily performed using the aforementioned example embodiments of the present invention without departing from the essential characteristics of the present invention. Contents of each claim of the claims may be combined with other claims without reference relationship within the scope understandable through the present specification.

Acknowledgement

The present invention is created with the support of the following research projects.
1. Research Project 1
   Project Identification No.: 2018900054
   Project No.:20180005490031001
   Department Name: Ministry of Science and ICT
   Name of Task Management (Professional) Institution: Institute for Information & communication Technology Planning & evaluation
   Name of Research Project: SW computing industry source technology development project
   Research Project Title: Development of scalable order-guaranteed OS for manycore ultra-capacity memory
   Name of Institution to carry out Project: Korea Advanced Institute of Science and Technology (KAIST)
2. Research Project 2
   Project Identification No.: 2020123008
   Project No.: 2020R 1A2C300852511
   Department Name: Ministry of Science and ICT
   Name of Task Management (Professional) Institution: National Research Foundation of Korea
   Name of Research Project: Science and Engineering Basic Research Project
   Research Project Title: Study on contention-free scalable input/output subsystem for ultra-low-latency storage device (2020) Institution Name to carry out Project: Korea Advanced Institute of Science and Technology (KAIST)

What is claimed is:

1. A multi-file transaction method comprising:
   a first operation in which, for each of a plurality of files, a file system of a host stores a location of an inode block that is a block in which an inode of the file is written within a storage in a master commit block; and
   a second operation in which the file system stores the master commit block in the storage.

2. The multi-file transaction method of claim 1, wherein, in response to the storage discovering the master commit block while performing a process of restoring blocks of the storage, the storage is configured to restore contents indicated by inodes written in the plurality of mode blocks stored in the master commit block.

3. The multi-file transaction method of claim 1, wherein, in the first operation, the file system is configured to provide contents of a transaction related to the file to the storage before storing the location of the inode block of the file in the master commit block, and between the first operation and the second operation, the storage is configured to write contents of a transaction related to the plurality of files in a non-transitory memory of the storage, and, in response to the storage discovering the master commit block while performing a process of restoring blocks of the storage, the storage is configured to restore contents indicated by inodes written in the plurality of inode blocks stored in the master commit block.

4. The multi-file transaction method of claim 1, further comprising:

an operation in which the file system generates the master commit block when a commit call is received from an application of the host before the first operation, wherein, in the first operation, the file system is configured to provide contents of a transaction related to the file to the storage before storing the location of the inode block in the master commit block.

5. The multi-file transaction method of claim 4, wherein, in response to the file system providing the contents of the transaction related to the file to the storage, the storage is configured to store the contents of the transaction in a transitory memory of the storage.

6. The multi-file transaction method of claim 1, further comprising:

an operation in which the file system stores a first flag in the master commit block between the first operation and the second operation, wherein, in response to the first flag being verified to be present in a first block read by the storage while the storage is performing a process of restoring blocks of the storage, the storage is configured to determine that the first block is the master commit block.

7. The multi-file transaction method of claim 6, wherein, when the file system stores the first flag in the master commit block, a predetermined value is stored in a predesignated part of the master commit block, and when the file system does not store the first flag in the master commit block, a value different from the predetermined value is stored in the predesignated part of the master commit block.

8. The multi-file transaction method of claim 6, wherein the storage is configured to restore contents indicated by inodes stored in the plurality of inode blocks stored in the first block.

9. The multi-file transaction method of claim 1, further comprising:

an operation in which the file system flushes the storage between the first operation and the second operation.

10. The multi-file transaction method of claim 9, wherein, when the file system flushes the storage, the storage is configured to store contents of a transaction related to the plurality of files in information written in a transitory memory of the storage in a non-transitory memory of the storage.

11. A host comprising:

a processing unit; and a communication unit, wherein the processing unit is configured to execute a file system of the host, and the file system is configured to execute a first operation of, for each of a plurality of files, storing a location of an inode block that is a block in which an inode of the file is written within a storage in a master commit block; and a second operation of storing the master commit block in the storage using the communication unit.

12. The host of claim 11, wherein, in the first operation, the file system is configured to provide contents of a transaction related to the file to the storage before storing the location of the inode block of the file in the master commit block, and between the first operation and the second operation, the storage is configured to write contents of a transaction related to the plurality of files in a non-transitory memory of the storage, and, in response to the storage discovering the master commit block while performing a process of restoring blocks of the storage, the storage is configured to restore contents indicated by inodes written in the plurality of inode blocks stored in the master commit block.

13. The host of claim 11, wherein, in response to the storage discovering the master commit block while performing a process of restoring blocks of the storage, the storage is configured to restore contents indicated by inodes written in the plurality of inode blocks stored in the master commit block.

14. A computing device comprising:

a host; and a storage, wherein the host is configured to execute a file system, the file system is configured to execute a first operation of, for each of a plurality of files, storing a location of an inode block that is a block in which an inode of the file is written within a storage in a master commit block; and a second operation of storing the master commit block in the storage, and in response to discovering the master commit block stored in the storage while performing a process of restoring blocks of the storage, the storage is configured to restore contents indicated by inodes written in the plurality of mode blocks stored in the master commit block.

15. The computing device of claim 14, wherein, in the first operation, the file system is configured to provide contents of a transaction related to the file to the storage before storing the location of the Mode block of the file in the master commit block, and between the first operation and the second operation, the storage is configured to write contents of a transaction related to the plurality of files in a non-transitory memory of the storage.

* * * * *